United States Patent [19]
Gurtler

[11] 3,890,628
[45] June 17, 1975

[54] LIQUID CRYSTAL LIGHT CONTROL DEVICE AND CIRCUIT

[75] Inventor: Richard W. Gurtler, Mesa, Ariz.

[73] Assignee: Motorola, Inc., Chicago, Ill.

[22] Filed: Oct. 23, 1973

[21] Appl. No.: 408,779

[52] U.S. Cl............................ 354/227; 350/160 LC
[51] Int. Cl. ............................................. G03b 9/56
[58] Field of Search .............. 354/227; 350/160 LC

[56] References Cited
UNITED STATES PATENTS

| | | | |
|---|---|---|---|
| 2,705,903 | 4/1955 | Marshall | 354/227 |
| 3,007,388 | 11/1961 | Ogata et al. | 354/227 |
| 3,433,139 | 3/1969 | Beyen et al. | 354/227 |
| 3,476,029 | 11/1969 | Schreckendgust | 354/227 |

*Primary Examiner*—Richard A. Wintercorn
*Assistant Examiner*—Russell E. Adams, Jr.
*Attorney, Agent, or Firm*—Vincent J. Rauner; Willis E. Higgins; Maurice J. Jones, Jr.

[57] ABSTRACT

Light and image transmission for a precisely controllable time duration is provided by two twisted nematic, liquid crystal cells sandwiched between three polarizers. The first and second polarizers are polarized in a first direction and the third polarizer is polarized in a second direction. If the first cell is not activated, the plane of polarization of light passed by the first polarizer is rotated by the first cell so that the light is absorbed by the second polarizer. If only the first cell is activated, the light and image are passed through the device. If the second cell is activated, the plane of polarization of the light passing through the second cell is no longer rotated so that the light is absorbed by the third polarizer. Circuitry for operating and a camera including the device are also disclosed.

5 Claims, 11 Drawing Figures

LIQUID CRYSTAL LIGHT CONTROL DEVICE AND CIRCUIT

CROSS REFERENCE TO RELATED APPLICATION

The subject matter of the present application is related to the subject matter of an application entitled "Method For Fabricating A Liquid Crystal Display Device", which was filed on May 23, 1972, for Richard W. Gurtler and bears Ser. No. 256,028.

BACKGROUND OF THE INVENTION

There are many present day applications wherein it is desired to precisely control the duration of time during which light is conducted or transmitted through an aperture. More specifically, many cameras include elaborate mechanical shutter control mechanisms which enable a photographer to manually set the amount of time or which automatically set the amount of time during which light is transmitted through the lens to thereby control the exposure of photographic film within the camera. Some of these mechanical time controlling devices and particularly the automatically setting types are not capable of accurate shutter control. Moreover, a given setting may be undesirably temperature responsive because of the contraction and expansion of the parts comprising the mechanical shutter control mechanism. Furthermore, the fabrication, assembly and repair of variable mechanical shutters is tedious and requires skilled workmen. Because of the expense and other problems associated with mechanical shutters, it is desirable to provide an electronically activated and controlled light valve or shutter which facilitates accurate control of the time duration that the shutter remains transmissive.

In the past, electronic light control has been achieved by utilizing thin layers of liquid crystal material. One liquid crystal light control device operates in the transmissive mode wherein light is passed from a light source located on one side of the device to the other side of the device. This device includes a cell having twisted nematic liquid crystal material sandwiched between two polarizers, which are polarized in a first direction. The device takes advantage of the birefringent properties of the twisted nematic liquid crystal composition which causes rotation of the plane of polarization of polarized light incident thereon. More specifically, in the "opaque" mode of operation, only light polarized in the first direction passes through the first polarizer. If an electric field is not applied to the liquid crystalline material, the plane of polarization of the light is rotated 90° as the light is transmitted therethrough. As a result, the second polarizer absorbs the light. Hence, with no electric field applied, the device transmits virtually no light.

In the transmissive mode, the domains of the liquid crystal composition are aligned in response to an electric field applied across the liquid crystalline material such that the axes of substantially all of the liquid crystal molecules are parallel to the direction of the light rays passed by the first polarizer. Hence, the plane of polarization of the light passed by the first polarizer is not rotated as the light passes through the liquid crystal material. Consequently, the second polarizer transmits light and an image while the field is applied. After the field is removed, the twisted nematic liquid crystal molecules return to their "twisted" state and the light is again absorbed by the second polarizer.

The liquid crystalline matter utilized in such devices can typically have field dependent rise times on the order of 1 millisecond and uncontrollable decay times of from 30 to 300 milliseconds. "Rise time" is defined as the time it takes for the liquid crystal domains to reach their field dependent positions after an electric field is applied having a magnitude above the threshold of the device. "Decay time" is defined as the time it takes for the domains to return to their non-field dependent state after the magnitude of the applied field is reduced below the threshold. Many light control applications such as camera shutters, for instance, require that both the initiation and the termination of the transmissive mode of operation be subject to precise control. Consequently, the foregoing twisted nematic structure is unsatisfactory for use as a shutter because of the uncontrollable and long decay time associated therewith which determines how long it takes for the device to reach its maximum light blocking capability after the field is removed or reduced below threshold.

SUMMARY OF THE INVENTION

One object of the invention is to provide a light control device which transmits light for a predetermined period of time.

Another object of this invention is to provide a liquid crystal, light control device which transmits light for an adjustable, predetermined duration of time which duration is precisely controllable by electronic circuitry.

Still another object of the invention is to provide an electronically controlled light control device utilizing a twisted nematic liquid crystalline material and which transmits light within 1 millisecond after a first control signal is applied thereto and which terminates the transmission of light within 1 millisecond after a second control signal is applied thereto.

A further object of this invention is to provide an electronically controlled shutter which is suitable for use in cameras.

A still further object of this invention is to provide an electronically controlled liquid crystal shutter and an electronic control circuit therefor which cooperate to provide a precisely controlled light transmissive duration and which are relatively inexpensive as compared to a mechanical shutter and mechanical control mechanism which cooperate to provide the same precisely controlled light transmissive duration.

The light control device of the invention includes first and second twisted nematic liquid crystal cells which are sandwiched between three polarizers. The first polarizer, which is polarized in the first direction, is juxtapositioned against a first surface of a first liquid crystal cell. The liquid crystal material adjacent to the first polarizer is also aligned in the first direction. The unactivated liquid crystal material adjacent the second surface of the first liquid crystal cell is aligned in a second direction which is perpendicular to the first direction. The orientation of the unactivated liquid crystal material between the first and second surfaces varies between the first and second directions. The second polarizer, which is also polarized in the first direction, is juxtapositioned against the second surface of the first liquid crystal cell. The second liquid crystal cell has a first surface which is juxtapositioned against the second polarizer. The unactivated liquid crystal material adjacent the first surface of the second cell is also aligned in the first direction. The unactivated liquid crystal material adjacent to the second surface of the second cell is aligned in the second direction. The third polarizer, which is polarized in the second direction, is juxtapositioned against the second surface of the second cell.

In the "steady state off" mode of operation, the plane of polarization of the light passed by the first polarizer is rotated by the first liquid crystal cell and absorbed by the second polarizer. In the "on" mode of operation, the first liquid crystal cell is activated and no longer rotates the plane of polarization of light passed by the first polarizer so that the light is passed through the second polarizer, the second liquid crystal cell and the third polarizer. In the "dynamic-off" mode of operation, the second cell is energized and no longer rotates the plane of polarization so that the light is absorbed by the third polarizer. Electronic circuitry is employed to precisely and rapidly "open" and "close" the liquid crystal device.

DETAILED DESCRIPTION OF THE PREFERRED EMBODIMENT

The light control device or electronic shutter of the preferred embodiment of the invention includes two liquid crystal cells, which can have identical mechanical structures, and three polarizers which "sandwich" the cells. A method of fabricating a cell, which is similar to the cells utilized in the structure of the subject invention, is described in the aforementioned related patent application. A cell includes first and second rigid members each of which have electrodes connected thereto. The members cooperate with each other to enclose a suitable twisted nematic liquid crystal composition and to hold the electrodes in a spaced relationship to each other and to the liquid crystal material.

Figure 1:
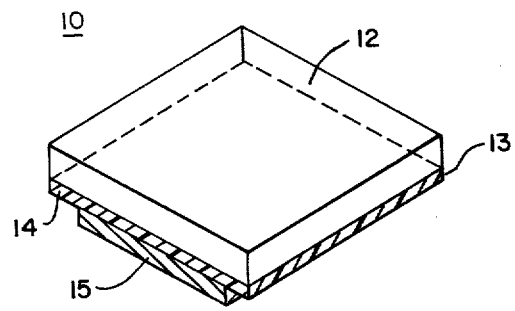
FIG. 1 is a perspective view of one of the members of a liquid crystal cell employed in the light control device of one embodiment of the invention.

More specifically, FIG. 1 shows first member 10 which is comprised of a rectangular glass piece 12 having dimensions on the order of 1 inch × 1 inch × 30 mils. A transparent conductive electrode 13 is affixed to outwardly facing surface 14 of the glass. Transparent electrode 13 may be a layer of indium oxide having a thickness of 1,000 A which is deposited on surface 14 of glass 13 by sputtering, for instance. Next, a thin layer of silicon dioxide 15, having a thickness on the order of 3,000 to 5,000 A, is deposited on the electrode. Silicon dioxide 15 is patterned by a known photolithographic process to selectively expose portions of the surface of electrode 13.

Figure 2:
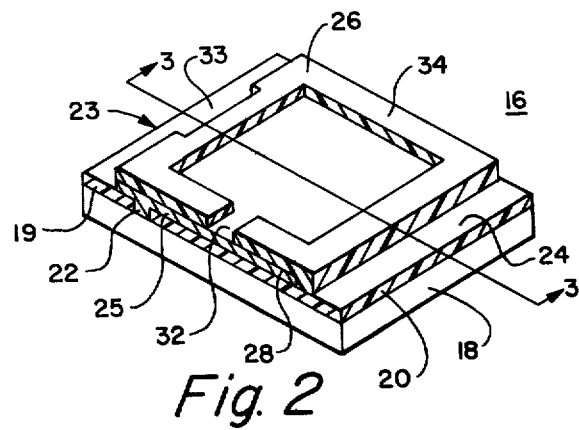
FIG. 2 is a perspective view of another member which cooperates with the member of FIG. 1.

FIG. 2 shows second member 16 which is comprised of rectangular glass piece 18 with dimensions on the order of 1.5 inch × 1 inch × 30 mils and having a surface 19 on which a transparent indium oxide electrode 20, which has a thickness of 1,000 A, is sputtered. Groove 22 in electrode 20 exposes a rectangular portion of the outwardly facing surface 19 of glass piece 18 and is provided by a known phototithographic process including: application of photoresist material, exposure of the photoresist to light through a mask, removal of unexposed photoresist and subsequent etching and cleaning of the contact. Groove 22 separates electrode 20 into portions 23 and 24. A thin layer of silicon dioxide 25 is deposited on electrode portions 23 and 24 and in groove 22. Silicon dioxide 25 is patterned by known photolithographic techniques to selectively expose the surfaces of electrodes 23 and 24.

Next, an electrically insulative layer 26 of photopolymeric material is deposited on outwardly facing surface 28 of silicon dioxide 25 and on electrode portions 23 and 24. This material may be chosen from one of the group of polyesters with photosensitizers added. An example of such a photopolymeric material is identified by the trade name RISTON. The thickness of RISTON layer 26 is controlled to be on the order of 0.0005 inches to properly space electrode 20 away from electrode 13 of member 10. Photopolymeric layer 26 is patterned by exposing areas to be retained to ultra violet light and developing using known developers such as chlorothene V.G. to remove the unexposed areas. Cavity 30, opening 32 and indent 33 are formed by the patterning of photopolymeric material 26. Opening 32 extending into cavity 30 is provided to enable cavity 30 to be filled with a liquid crystal composition at a later stage of the fabrication of the device, as will be subsequently explained in greater detail. Indent 33 in photopolymeric layer 26 is provided to facilitate electrical contact between electrode portion 23 and electrode 13, as shown in FIG. 3.

Figure 3:
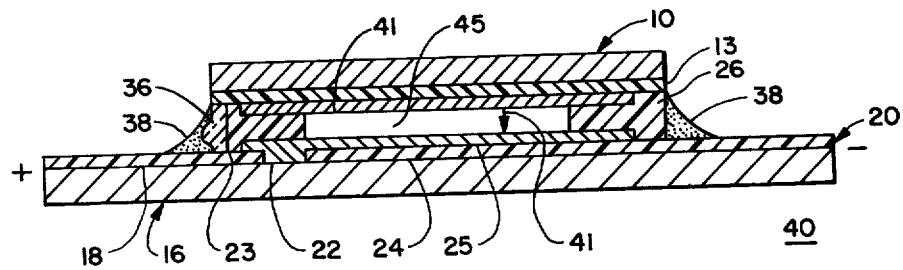
FIG. 3 is a cross sectional view of one of the liquid crystal cells employed in the light control device of one embodiment of the invention.

After cavity 30 has been provided, member 10 and member 16 are placed together such that silicon dioxide 15 rests against outwardly facing surface 34 of photopolymeric layer 26, as shown by the sectional view of FIG. 3, which is taken along line 3—3 of FIG. 2. The structure is then heated under pressure to bond electrode 13 to the photopolymeric layer to assure the proper spacing between electrodes 13 and 20. Next, the liquid crystal composition is introduced into cavity 30 through opening 32. This may be accomplished by first evacuating the cavity in a suitable chamber and then permitting the liquid crystal to flow by capillary action into the cavity. After cavity 30 is filled, opening 32 is sealed with epoxy or by some other suitable means. Conductive epoxy 36 or some other contacting substance 36 may then be used to make conductive connection between electrode portion 23 and electrode 13. This step may also be accomplished during the pressure bonding. Finally, a sealing epoxy 38 is applied around the cell to complete the cell structure 40, shown in FIG. 3.

The chemical compound or liquid crystal mixture located in cavity 30 is chosen from a group of substances which exhibit physical characteristics some of which are typically associated with liquids and others which are typically associated with solid crystals. More specifically, some substances exhibit viscosities which are ordinarily associated with liquids and optical scattering and light transmission characteristics which are typically unique to solid crystals. Because of these similarities to both the liquid and crystalline forms of matter, the name "liquid crystals" has become generic to substances exhibiting these dual properties.

Liquid crystals resemble solid crystals in that the longitudinal axes of the rod-shaped molecules of a liquid crystalline substance are regularly oriented in a fashion similar to but less extensive than the molecular orientation of a crystalline solid. Liquid crystals are known to appear in many different forms, one of which is known as the "nematic" structure wherein the molecules are arranged with their major axes approximately parallel to each other. The molecules of nematic liquid crystal substances are not organized into definite layers as in other liquid crystalline structures.

There are many nematic liquid crystalline materials suitable for use in the cells of the device of the invention. Two examples are:

1. MBBA:PEBAB at 85:15 where MBBA is N-(p-Methoxybenzylidene) -p-butylaniline and PEBAB is p-ethoxybenzylidene-p-aminobenzonitrile; and
2. Commercially available Kodak mixture number 11900. The nematic liquid crystalline material used exhibits positive dielectric anisotropy and is chemically stable over the desired temperature range of operation.

The molecular structures of liquid crystalline matter are responsive to electric and magnetic fields. Referring to FIG. 3, if a positive potential is applied through electrode portion 23 and conductor 36 to electrode 13 and if a negative potential is applied to electrode portion 24, an electric field is created in the liquid crystalline material 45 in cavity 30 between the electrodes in the direction of arrow 41. If the magnitude of the field is large enough to activate the liquid crystal material, each rod-like molecule thereof, except those immediately adjacent silicon dioxide layers 15 and 25, tends to orient itself with its major axis parallel to the field and perpendicular to the surfaces of the cell. This is a characteristic of liquid crystal materials exhibiting positive dielectric anisotropy. The unactivated orientation of the molecules of the nematic liquid crystal material can be controlled by rubbing the surface of one of the glass members with a buffering wheel or the like. As a result, the molecules of the liquid crystal line up in the same direction as the rubbing action and remain in this direction until a field of sufficient magnitude is applied. Light travels at a different velocity in the direction parallel to the axes of the molecules than it travels in the direction perpendicular to the axes of the liquid crystal molecules. Additional information about liquid crystal material can be obtained from the article "Liquid Crystal Displays", which was written by Richard W. Gurtler and Craig Maze and published in the *IEEE Spectrum*, November, 1972.

Figure 4:
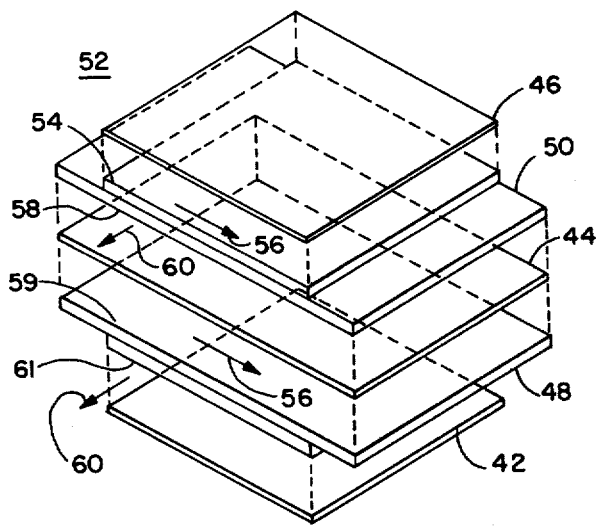
FIG. 4 is an exploded view of the light control device.

FIG. 4 shows an exploded view of one light control device or shutter 52 which is comprised of polarizers 42, 44, 46 and liquid crystal cells 48 and 50. Each of cells 48 and 50 is similar in construction to cell 40 of FIG. 3. Polarizers 42, 44 and 46 may be comprised of polaroid polarizers HN 35 or HN 52 or others. Before assembling light control device 52, top surfaces 54 and 59 of cells 50 and 48 are rubbed in a first direction indicated by arrows 56 and the bottom surfaces 58 and 61 of cells 50 and 48 are rubbed in a second direction indicated by arrows 60, which is perpendicular to the direction of arrows 56. Consequently, the nematic liquid crystalline material of both cells is caused to assume the known "twisted" configuration. More particularly, in cell 50, for instance, the axes of the liquid crystal molecules in the plane parallel and immediately adjacent to surface 54 are aligned in the direction of arrow 56 and the molecules in the plane parallel and immediately adjacent to surface 58 are aligned in the direction of arrow 60. The molecules between these planes tend to be aligned along axes having a multiplicity of directions which more nearly approach the direction of arrow 60 the closer the plane of the molecule is located to surface 58 and more nearly approach the direction of arrow 56 the closer the plane of the molecule is located to surface 54. This results in a continuous rotation of the axes of the molecules located between surfaces 54 and 58. Thus, for instance, the angle of orientation of the molecules in the liquid crystal material of cell 50 tend to more nearly approach an angle of 90° with respect to the orientation of the molecules near surface 54 in proportion to their distance from surface 54. The known "twisted" orientation of the unactivated molecules of cells 48 and 50 is diagrammetically illustrated in FIG. 6 by lines 62 and 63 which represent the projection of the axes of the molecules on the plane of the drawing, which plane is parallel to the end surfaces of cells 48 and 50 and perpendicular to parallel surfaces 54, 58, 59 and 61.

Figure 5:
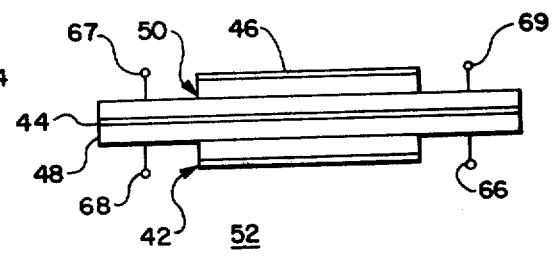
FIG. 5 is an end view of the light control device of FIG. 4 in its assembled form.

As shown in FIGS. 4, and 5, cell 48 is inverted with respect to cell 50 so that the longer structural members of the cells are juxtapositioned next to each other on each side of polarizer 44. Polarizer 46 is juxtapositiond next to outwardly facing surface 54 of cell 50 and polarizer 42 is juxtapositioned adjacent to the outwardly facing surface 61 of cell 48. FIG. 5 shows the relationship of the polarizers and cells of assembled shutter 52, which may be held together by a mechanical frame or optically clear adhesives. The device includes adjacent terminals 66, 67, 68 and 69. Terminals 66 and 68 are adapted to receive an "image transmit" control signal and terminals 67 and 69 are adapted to receive an "image attenuate" control signal.

Figure 6:
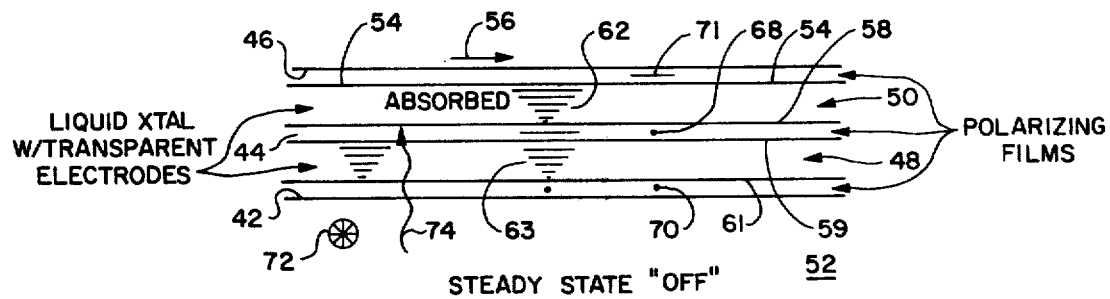
FIG. 6 is a diagrammatic view which illustrates the device of FIG. 5 in its "steady state off" mode of operation.

Polarizer 42 is polarized in a first direction as indicated by dot 70 of FIG. 6, which corresponds to the unactivated alignment of the liquid crystal molecules of cell 48 immediately adjacent to polarizer 42. Polarizer 44 is also polarized in the first direction as indicated by dot 68. The polarization of polarizer 44 corresponds to the unactivated alignment of the liquid crystal molecules of cell 50 in the plane immediately adjacent and parallel to polarizer 44 and polarizer 44 is cross polarized with respect to the unactivated alignment of the liquid crystal molecules of cell 48 in the plane parallel and adjacent to polarizer 44. Polarizer 46 is polarized in the same direction as the alignment of the liquid crystal molecules adjacent and parallel to surface 54 of cell 50, as indicated by line 71. Thus, polarizer 46 is polarized in a direction perpendicular to the polarization of polarizers 42 and 44.

The "steady state off" mode of operation of device 52 is described with respect to FIG. 6. Symbol 72 indicates a plurality of rays of randomly polarized light traveling in the direction indicated by arrow 74. Polarizing film 42 transmits light having electric field vector components which are polarized in the direction of polarization indicated by dot 70. The liquid crystal material of cell 48 twists or rotates the plane of polarization of the light in correspondence with the rotation of molecular axes of the molecules of the liquid crystal, as the light progresses through cell 48 toward polarizer 44. As a result, the light leaving cell 48 has a polarization which is rotated 90° with respect to the polarization of the light entering cell 48. Thus, the polarized light exiting from cell 48 is not aligned with the polarization of polarizer 44 and is therefore absorbed by polarizer 44. Consequently, light control device 52 tends to not transmit light in response to below threshold voltages applied to the terminals thereof.

Figure 7:
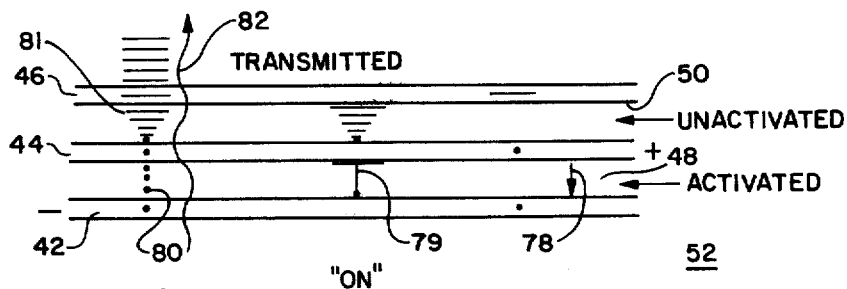
FIG. 7 is a diagrammatic view which illustrates the device of FIG. 5 in its "on" mode of operation.

FIG. 7 illustrates the "on" mode of operation wherein an instantaneous electric field 78 is developed across liquid crystal cell 48 in response to an "above threshold" potential difference of typically between 10 and 30 volts across terminals 66 and 68. The silicon dioxide layers of cell 48, corresponding to layers 15 and 25 of FIG. 3, enable alignment of the axes of the molecules in the liquid crystal layer with the field while preventing current flow through the cell. In response to the applied electric field, the longitudinal axes of substantially all of the liquid crystal molecules of cell 48 exhibit homeotropic alignment (perpendicular to the surface) with the instantaneous field, indicated by vector 78 so that the activated liquid crystalline material is oriented as indicated by line 79. Hence, the polarization of the light passed by polarizing film 42 remains unchanged as the light passes through activated cell 48 and polarizer 44, as indicated by dots 80. Cell 50, which is not energized rotates the plane of polarization of the polarized light transmitted by polarizer 44 so that the phase of the field vector of the light is shifted by 90 degrees before being applied to polarizer 46, as indicated by lines 81. Thus, polarizing film 46 also transmits the light and the image, as indicated by arrow 82 of FIG. 7.

The turn-on time of light control device 52 is controlled by how rapidly the molecules of cell 48 align in response to the applied electrical field. The speed of alignment depends on the thickness of the liquid crystal material, the magnitude of the voltage developed between terminals 66 and 68 and the species of liquid crystal material. Alignment of the molecules of cell 48, in effect, can open the shutter in about 1 millisecond after the "shutter-open" control voltage is applied across terminals 66 and 68 of FIG. 5.

After the shutter has been opened for nearly the predetermined desired amount of time, a second or "shutter-close" control signal is applied between terminals 67 and 69 which are connected to cell 50 to begin the "dynamic-off" mode of operation. This causes the molecules of liquid crystal cell 50 to line up in the same direction as the molecules of cell 48, as depicted by lines 83 in FIG. 8. As a result, the plane of polarization of the light 84 approaching film 46 is rotated 90° and is now out-of-phase with the polarization of polarizer 46. Thus, the light is absorbed and the image is blocked.

Thus, the closure time of the shutter after the occurrence of the "shutter-close" signal does not depend upon the "decay time" of liquid crystal molecules, as is the case with some prior art devices. As previously mentioned, that decay time is undesirably long such as on the order of 60 milliseconds and the decay time is not field controlled. The "closing" speed of the shutter of the invention is a function of the time it takes for rotation of the molecules of the liquid crystal of cell 50 away from their steady state or unactivated condition. This time is a function of the magnitude of the voltage applied across terminals 66 and 69 and thus can be controlled. As a result, the time for the shutter to close can be precisely controlled by adjusting the magnitude of the voltage across terminals 67 and 69, which may typically be between 10 and 30 volts, to cause a closure within about 1 millisecond from the occurrence of the "shutter-close" control signal. The duration of time the shutter remains open is controlled by controlling the time between the above-mentioned shutter-open and shutter-close control signals.

Therefore, light control device 52 functions as an electronically controlled shutter which can open within 1 millisecond of an applied shutter-open control signal, remains open for a desired selected time duration, and can close within 1 millisecond after the application of a shutter-close control signal. Since shutter 52 is responsive to electrical signals, the duration of time during which it transmits light can be precisely controlled by inexpensive, compact electronic circuits provided in monolithic integrated circuit form. Such circuitry can be readily designed to facilitate automatic control or manual setting of the shutter-open duration, or both.

Figure 9:
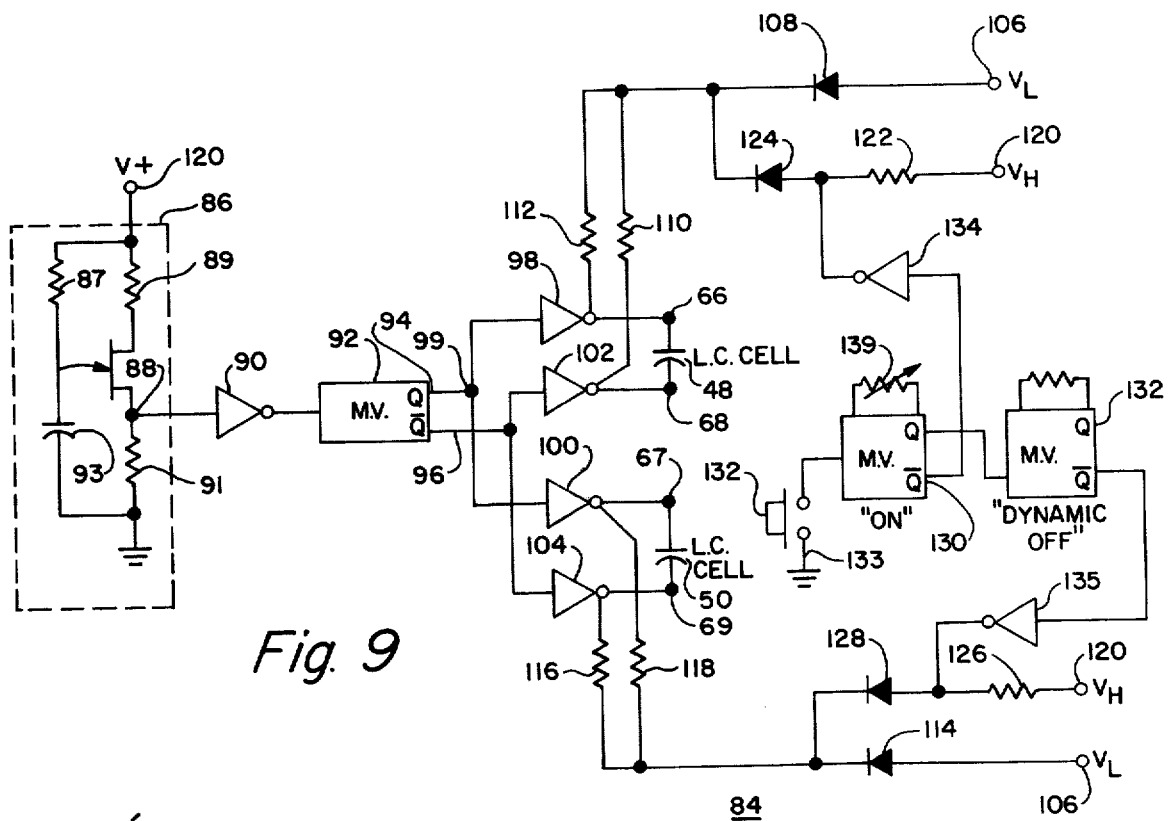
FIG. 9 is a diagram of a circuit suitable for operating the device of FIG. 5.

FIG. 9 discloses a partial block and partial schematic diagram of circuit 84 which generates control signals that are applied to cells 48 and 50 of shutter 52. Circuit 84 may be comprised of complementary metal-oxide-semiconductor devices. Circuit 84 includes a unijunction relaxation oscillator 86, of known configuration, having its output terminal 88 connected to inverter 90. Oscillator 86 includes resistors 87, 89, 91 and capacitor 93. The input terminal of bistable multivibrator 92 is connected to the output terminal of inverter 90. The "Q" output terminal 94 of multivibrator 92 is connected to the input terminals of inverters 98 and 100 and "$\overline{Q}$" output terminal 96 is connected to the input terminals of inverters 102 and 104. The output terminals of inverters 98 and 102 are connected to terminals 66 and 68 of cell 48 and the output terminals of inverters 100 and 104 are connected to terminals 67 and 69 of cell 50.

Power terminal 106 is adapted to receive a low level d.c. (direct current) voltage $V_L$ having a magnitude of on the order of one volt and which is applied through diode 108 and resistor 110 to inverter 102. Voltage $V_L$ is less than the threshold voltage necessary to cause homeotropic orientation of the molecules of cells 48 and 50. The voltage $V_L$ is also applied through diode 108 and resistor 112 to inverter 98. Inverters 98 amd 102 are alternately switched on and off by signals derived from oscillator 86 to apply a low level a.c. (alternating current) voltage as a bias for cell 48. Similarly, the voltage $V_L$ is applied through diode 114 and resistor 116 to inverter 104 and through diode 114 and resistor 118 to inverter 100. Inverters 100 and 104 are alternately switched on and off to apply a low level a.c. voltage as a bias for cell 50.

Power supply terminal 120 is adapted to receive a high level d.c. voltage $V_H$ having a magnitude of between 10 to 30 volts. Voltage $V_H$ has a high enough magnitude to assure rapid homeotropic orientation of the molecules of cells 48 and 50. This driving voltage is selectively applied through resistor 122, diode 124 and resistors 110 and 112 to inverters 98 and 102 which drive cell 48. Similarly, the high level voltage is selectively applied through resistor 126, diode 128 and resistors 116 and 118 to inverters 100 and 104 which drive cell 50.

The application of the biasing and driving voltages is controlled by multivibrators 130 and 132. The input terminal of multivibrator 130 is connected through shutter control switch 132 to the ground or reference terminal 133. The "Q" output terminal of multivibrator 130 is connected to the input terminal of multivibrator 132 and the "$\bar{Q}$" terminal of multivibrator 130 is connected through inverter 134 to the junction between resistor 122 and diode 124. The "$\bar{Q}$" output terminal of multivibrator 132 is connected through inverter 135 to the junction of resistor 126 and diode 128. Variable resistor 139 controls the duration of the output pulse of multivibrator 130 and, consequently, the time duration that the light control device remains transmissive. Resistor 139 could be replaced by a light sensitive device to provide automatic control of the "dynamic-on" condition as a function of light intensity.

Figure 10:
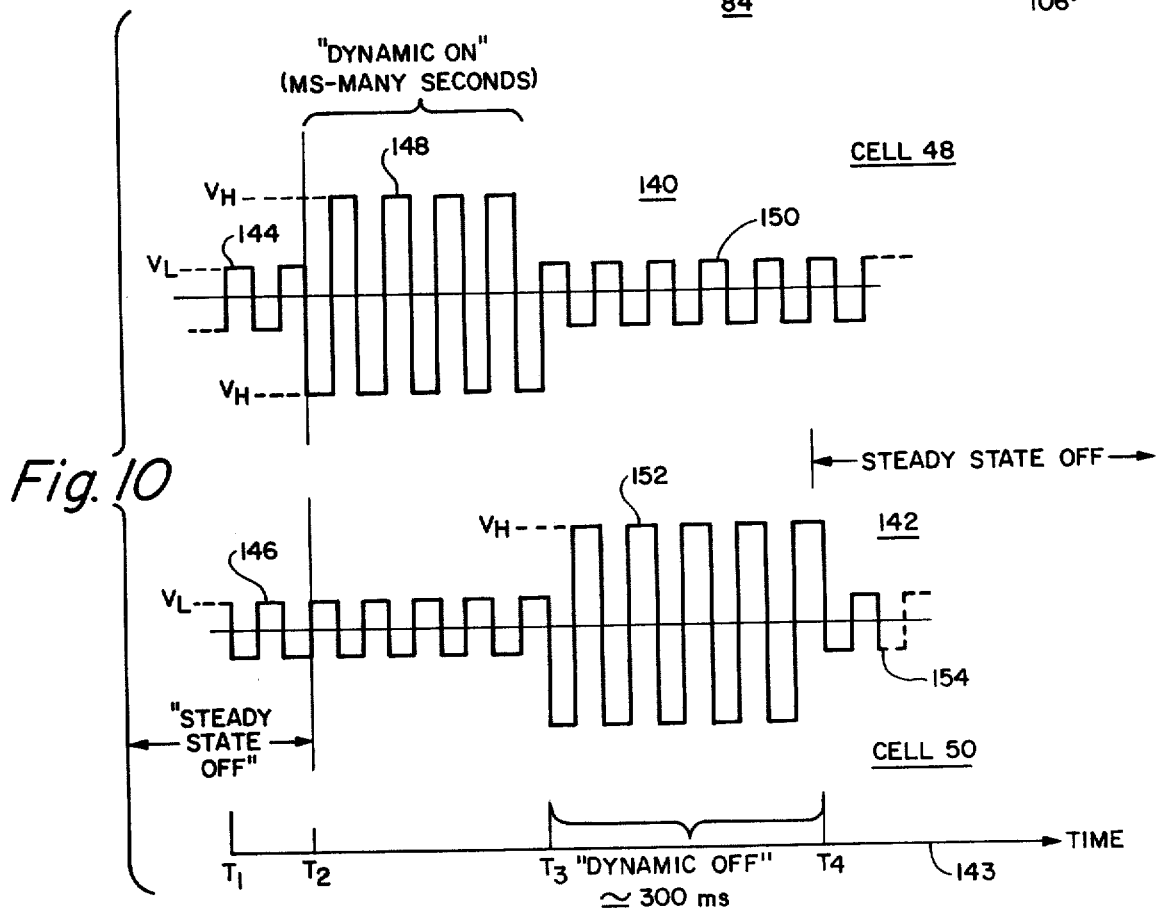
FIG. 10 shows waveforms useful in understanding the operation of the circuit illustrated in FIG. 9.

The waveforms of FIG. 10 illustrate the operation of circuit 84. More specifically, waveform 140 indicates the rectangular a.c. voltage developed across the liquid crystalline material of cell 48 and waveform 142 indicates the rectangular a.c. voltage developed across the liquid crystalline material of cell 50. At time $T_1$, shown on axis 143, the liquid crystal, light control device 52 is in its "steady state off" mode of operation and the "Q" outputs of monostable multivibrators 130 and 132 are logical "1's". Consequently, inverters 134 and 135 provide logical "0's", which are at ground potential, to the junction between resistor 122 and diode 124 and to the junction between resistor 126 and diode 128. Hence, the output voltages of inverters 98, 100, 102 and 104 are clamped to near voltage level $V_L$. Relaxation oscillator 86, inverter 90 and bistable multivibrator 92 cooperate to drive inverters 98, 100, 102 and 104 "on" and "off" so that a rectangular voltage having a magnitude of $V_L$ is applied across liquid crystal cells 48 and 50 to bias them in a "steady state off" ready condition, as indicated by waveform portions 144 and 146. The molecules of the cells are oriented as shown in FIG. 6. This biasing enables cells 48 and 50 to rapidly reach their activated states in response to a shutter-open control signal.

At time $T_2$ the "on" mode of operation is begun by closing switch 132 to provide the "shutter-open control" signal which triggers monostable multivibrator 130. Consequently, the "Q" output signal of multivibrator 130 changes to a logical "0" level. As a result, inverter 134 provides a logical "1" at its output terminal which causes the high level voltage $V_H$ to be applied to inverters 98 and 102. Consequently, between times $T_2$ and $T_3$, cell 48 receives a driving signal of an amplitude approaching $V_H$, as indicated by signal portion 148 of FIG. 10. Since voltage $V_H$ has a sufficient magnitude to re-orient the liquid crystal molecules of cell 48, an image is transmitted through device 52, as indicated in FIG. 7.

Figure 8:
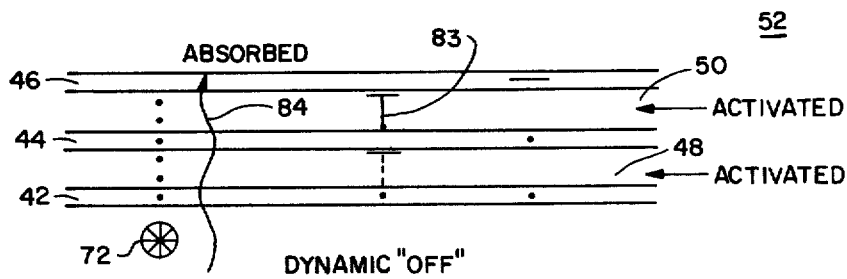
FIG. 8 is a diagrammatic view which illustrates the device of FIG. 5 in its "dynamic-off" mode of operation.

At time $T_3$, the "dynamic-off" mode of operation begins in response to the "Q" output signal of monostable multivibrator 130 changing state and simultaneously triggering multivibrator 132. As a result, monostable multivibrator 132 provides a logical "0" to inverter 135 so that the voltage level across cell 50 changes to a higher amplitude approaching $V_H$, as indicated by waveform portion 152 of FIG. 10. The higher voltage changes the orientation of the liquid crystal material of cell 50, as indicated in FIG. 8. Although the "$\bar{Q}$" output signal of multivibrator 130 returns to the logical "0" level at time $T_3$, cell 48 remains activated for an uncontrollable time duration. However, polarizer 46 absorbs the light and image transmitted by cells 48 and 50 so that the decay time of cell 42 doesn't affect the time it takes for the shutter or light control device 52 to become non-transmissive.

By time $T_4$, the liquid crystal material of cell 48 has reached its steady state, twisted condition. At time $T_4$, multivibrator 132 again applies a logical "1" to inverter 135 so that a logical "0" is again connected to the junction between diode 128 and resistor 126. Consequently, the voltage across liquid crystal cell 50 returns to its low magnitude, as indicated by waveform portion 154 of FIG. 10. Thus, the light control device returns to its "steady state off" mode of operation at time $T_4$ to complete one cycle of its operation.

When shutter device 52 is in its "steady state off" mode of operation, it is possible for from 0.01 percent to 1 percent of the light incident on polarizer 42 to be undesirably conducted therethrough. Thus, in some applications, it may be desired to utilize liquid crystal shutter device 52 in series with a mechanical shutter to prevent film fogging. The mechanical shutter could be provided in the light path either before or after the electronic shutter. Such mechanical shutter could be of an inexpensive variety and could be opened in response to the closure of switch 132 and could remain open for a relatively long time after the liquid crystal shutter had returned to its "dynamic-off" mode of operation. Thus, the liquid crystal shutter would still control how long the aperture remains open whereas the mechanical shutter connected in series therewith would merely protect the film from fogging. Although the liquid shutter only transmits from about 20 to 40 percent of the light incident thereon when in the "on" mode of operation, this light level is sufficient for many applications.

Figure 11:
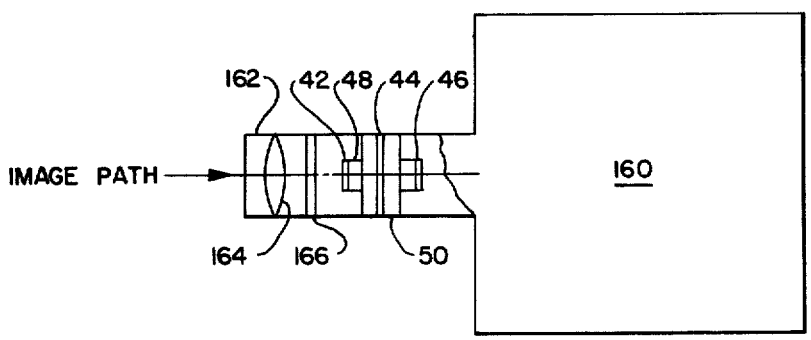
FIG. 11 shows a partial cross sectional side view of a simplified camera employing the light control device of FIG. 5 as a shutter.

FIG. 11 is a partial cross sectional side view of a simplified camera 160, which is not drawn to scale. A portion of the barrel 162 of camera 160 has been broken away to reveal the internal structure thereof. Lens 164 is located near one end of barrel 162. Mechanical shutter 166, which may have any one of a variety of known inexpensive structures, is located between lens 164 and liquid crystal shutter 52. Polarizer 42 faces lens 164 and polarizer 46 faces the film (not shown) within the camera. Lens 164, mechanical shutter 166 and liquid crystal shutter 52 are all located in series along the designated image path.

In operation, mechanical shutter 166 is opened simultaneously with or slightly before liquid crystal shutter 52 is operated to its "dynamic-on" mode of operation. Either mechanical shutter 166 or its associated mechanical control mechanism can be arranged to actuate switch 132 after the mechanical shutter has opened to accomplish this result. Moreover, mechanical shutter 166 can be designed in a known manner to close a fixed predetermined period of time after it has opened. This predetermined period of time is selected to be greater than the maximum duration of the variable dynamic-on period of liquid crystal shutter 52. Thus, liquid crystal shutter 52 regulates the time period during which film included within camera 160 is exposed to the image. As previously pointed out, liquid crystal shutter 52 can be arranged to provide precise automatic or manual control of this exposure time as a function of light intensity, film speed, etc. Mechanical shutter 166 protects the film within camera 160 from unwanted exposure due to the slight light leakage of liquid crystal shutter 52. For some applications a lens cap could perform the function of mechanical shutter 166. The circuitry of FIG. 9 can be provided in the form of an MOS integrated circuit which is located inside camera 160 and electrically connected to liquid crystal shutter 52.

What has been described, therefore, is an electronic liquid crystal shutter or light control valve which is inexpensive, reliable and compact. Moreover, the electronic shutter lends itself to precise control by solid state electronic circuitry which can be provided in inexpensive form and readily maintained. The light control valve can open within one millisecond of a "shutter-open" control signal and can close within one millisecond of a "shutter-close" control signal. A circuit has also been described which is suitable for operating the liquid crystal shutter. Furthermore, a simplified camera utilizing the liquid crystal shutter has been described.

I claim:

1. A camera including in combination:

lens means located in an image path suitable for transmitting an image to be photographed; and normally closed liquid crystal shutter means located in the image path and arranged to receive the image transmitted by said lens means, said liquid crystal shutter means including first and second liquid crystal cells and means for supplying operating potentials to said liquid crystal cells, the application of operating potential to the first of said cells causing molecules of liquid crystal material in said first cell to align and thereby to pass light through said shutter means, the subsequent application of operating potential to said second cell causing molecules of liquid crystal material in said second cell to align and thereby to block passage of light through said shutter means.

2. The camera of claim 1 further including:

normally closed mechanical shutter means located in said image path and in parallel with said lens means and said liquid crystal shutter means;

mechanical means connected to said mechanical shutter means for opening said mechanical shutter means for a first fixed predetermined period of time; and electrical circuit means electrically connected to said liquid crystal shutter means for opening said liquid crystal shutter means for a second variable predetermined period of time which has a maximum value that is less than said first fixed predetermined period of time.

3. The camera of claim 2 wherein said liquid crystal shutter means includes in combination:

first polarizer means polarized in a first predetermined direction;

first liquid crystal cell means with a first surface juxtapositioned along said first polarizer means and a second surface which is parallel to said first surface, said first liquid crystal cell means having liquid crystal material with selectively oriented molecules interposed between said first and second surfaces thereof;

second polarizer means juxtapositioned along said second surface of said first liquid crystal cell means, said second polarizer means also being polarized in said first predetermined direction;

second liquid crystal cell means with a first surface juxtapositioned along said second polarizer means and a second surface which is parallel to said first surface of said second liquid crystal cell means, said second liquid crystal cell means having liquid crystal material with molecules selectively oriented in the manner that said molecules of said first liquid crystal cell means are oriented; and third polarizer means juxtapositioned along second surface of said second liquid crystal cell means, said third polarizer means being polarized in a second predetermined direction which is perpendicular to the polarization of said first polarizer means and said second polarizer means.

4. The camera of claim 3 wherein:

said first and said second liquid crystal cell means each include twisted nematic liquid crystal material located between and adjacent to said first and second surfaces thereof, said liquid crystal material adjacent said first surface being aligned in said first predetermined direction, said liquid crystal material adjacent said second surface being aligned in said second predetermined direction, said liquid crystal material between said first and second surfaces having unactivated orientations which very between said first and said second predetermined directions.

5. The camera of claim 4 further including:

electrical circuit means having a first set of electrodes connected to said first liquid crystal cell means and a second set of electrodes connected to said second liquid cell means;

said electric circuit means having a first circuit providing a first control voltage which activates said first liquid crystal cell to render the light control device transmissive; and said circuit means having a second circuit providing a second control voltage which activates said second liquid crystal cell to render the light control device non-transmissive.

* * * * *